(12) United States Patent
Quan et al.

(10) Patent No.: US 7,108,226 B2
(45) Date of Patent: Sep. 19, 2006

(54) INTERIOR SEATING ARCHITECTURE FOR AIRCRAFT

(75) Inventors: William C. Quan, Newcastle, WA (US); Miguel A. Remedios, Carnation, WA (US)

(73) Assignee: The Boeing Company, Chicago, IL (US)

( * ) Notice: Subject to any disclaimer, the term of this patent is extended or adjusted under 35 U.S.C. 154(b) by 195 days.

(21) Appl. No.: 10/605,586

(22) Filed: Oct. 10, 2003

(65) Prior Publication Data

US 2005/0087650 A1    Apr. 28, 2005

(51) Int. Cl.
*B64D 11/06* (2006.01)
(52) U.S. Cl. .................. 244/118.6; 297/245; 297/244
(58) Field of Classification Search ............ 244/118.5, 244/118.6; 297/245, 244, 157.1, 174 R; 312/314, 312; 108/33, 48, 162, 176, 134
See application file for complete search history.

(56) References Cited

U.S. PATENT DOCUMENTS

| | | | |
|---|---|---|---|
| 2,953,103 A * | 9/1960 | Bohannon et al. .......... 105/315 |
| 6,000,659 A | 12/1999 | Brauer | |
| 6,155,519 A * | 12/2000 | Rajasingham ............ 244/118.6 |
| D439,063 S | 3/2001 | Round | |
| 6,857,700 B1 * | 2/2005 | Eastman et al. .......... 297/250.1 |
| 2002/0060484 A1 | 5/2002 | Schmidt-Schaeffer | |
| 2002/0070314 A1 * | 6/2002 | Schmidt-Schaeffer .... 244/118.6 |
| 2003/0080597 A1 | 5/2003 | Beroth | |

OTHER PUBLICATIONS

Offer for Sale of Cessna (archived): http://web.archive.org/web/20020803170331/www.ogarajets.com/aircraft_for_sale/CX_106/photos.htm.*
Description of Falcon 900 by Jet Aviation Charter Services: http://www.jetaviation.com/charterusa/charterusa-falcon900.php.*
http://www.controller.com/listings/forsale/detail.asp?PID=214259&OHID=1087882&guid=1571B35DFF6646F3AA3A455DB2EB7380.*

* cited by examiner

*Primary Examiner*—Timothy D. Collins
(74) *Attorney, Agent, or Firm*—Ostrager Chong Flaherty & Broitman P.C.

(57) ABSTRACT

A booth-type seating arrangement with fore and aft seats for airplanes and aircraft. A cabinet with a stowable video monitor and pull-up table can be positioned between the seats. Sliding gates integrated into the aisle seat end base can be deployed to form an enclosed play area for children. Theater-style seat bottoms can be provided which flip-up to provide more floor space. Child booster seats can be built into the seatbacks. The seatback and bottom cushions can articulate and slide within fixed frame members to combine with opposite cushions to form a flat sleeping configuration for passengers.

8 Claims, 6 Drawing Sheets

INTERIOR SEATING ARCHITECTURE FOR AIRCRAFT

BACKGROUND OF INVENTION

The present invention relates to aircraft, and more particularly to passenger seating and accessory systems for aircraft.

Passenger seating arrangements in commercial airlines and aircraft today is relatively standardized. Pluralities of sets of passenger seats are provided with the seats all facing in the forward direction and with some areas of seats separated by bulkheads or service facilities. Such seating arrangements, however, do not allow for practical interaction or shared activities for families with children or groups who are traveling together. Business travelers also do not have access to seated conference areas, which would allow more personal access and interaction. Further there is no play space available in commercial airlines today for young children.

Thus, there is a need for different seating accommodations and configurations, as well as related accessories, which allow families, groups traveling together, and businessmen to have more interaction and a more pleasurable flying experience.

There also is a need for better rest accommodations for passengers. Conventional airline seats typically do not fully recline, thus making it difficult for passengers to rest or sleep comfortably.

SUMMARY OF INVENTION

The present invention provides various seating arrangements and configurations, as well as related accessories, which are more accommodating to passengers' needs, particularly families with children, groups traveling together, and business travelers.

In one embodiment of the invention, pairs or groups of seats are positioned for and aft facing one another providing a "booth"-type configuration. This allows a family to sit together in a more personal configuration with face-to-face interaction. An adjacent sidewall credenza can be positioned between the facing sets of seats in order to accommodate a pull-up table, a video monitor, cup holders, and the like. The table can be used for interactive activities, eating, working, and the like, and preferably consists of hinged sections that can be fully or partially deployed so as to permit some floor space to be utilized simultaneously when desired. Also, depending upon the design, the "booth" can be integrated into the sidewall and windows of the aircraft. This would allow for a more personal and private atmosphere for either family or business conferencing.

In another embodiment of the invention, sliding gates can be integrated into the aisle sides or ends of the seats in order to be deployed to form an enclosed play area for children. This would prevent them from straying into the aisles. In addition, flip-up theater-type seats can be provided in order to allow more space for children to play in the area between facing sets of seats.

In addition, in another embodiment of the invention, a child booster seat can be built into one or more of the seatbacks in order to accommodate smaller children. This is particularly useful when a pull-up table is utilized.

In a still further embodiment of the invention, the seat cushions can articulate and slide to combine with opposed seat cushions to form a flat sleeping configuration for passengers.

DETAILED DESCRIPTION

Often, when families travel together in present commercial airlines and aircraft, the conventional rows of seats do not allow for any practical interaction or shared activities, especially for families with children. Also, with younger children, there is no play space available for them. Airlines currently do not have specific zones or dedicated seating that accommodates such needs.

Current airline seating arrangements also do not typically have seating conferences that can function as conferencing areas for the business travelers. Conventional airlines also are lacking in the use of video monitors and have inadequate resting/sleeping arrangements for passengers.

Figure 1:
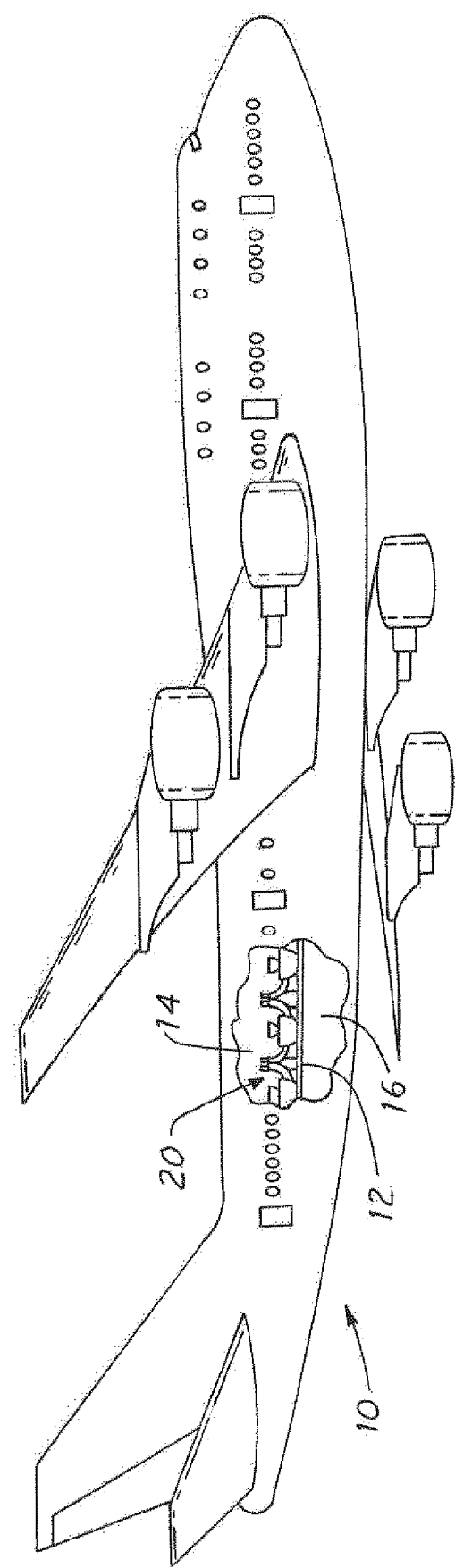
FIG. 1 illustrates a representative aircraft with which the present invention can be utilized.

The present invention provides improved seating arrangements and accessory items for use with any conventional airplane or aircraft. In this regard, FIG. 1 illustrates a representative commercial airplane with which the present invention can be utilized. It is to be understood, however, that the present invention can be utilized with any aircraft or airplane, even those which may be designed and utilized in the future.

In FIG. 1, the airplane is designated generally by the reference numeral 10. In the fuselage, the airplanes typically have a floor member 12 which separates the passenger space or cabin 14 from the lower bay or luggage area 16.

Figure 2:
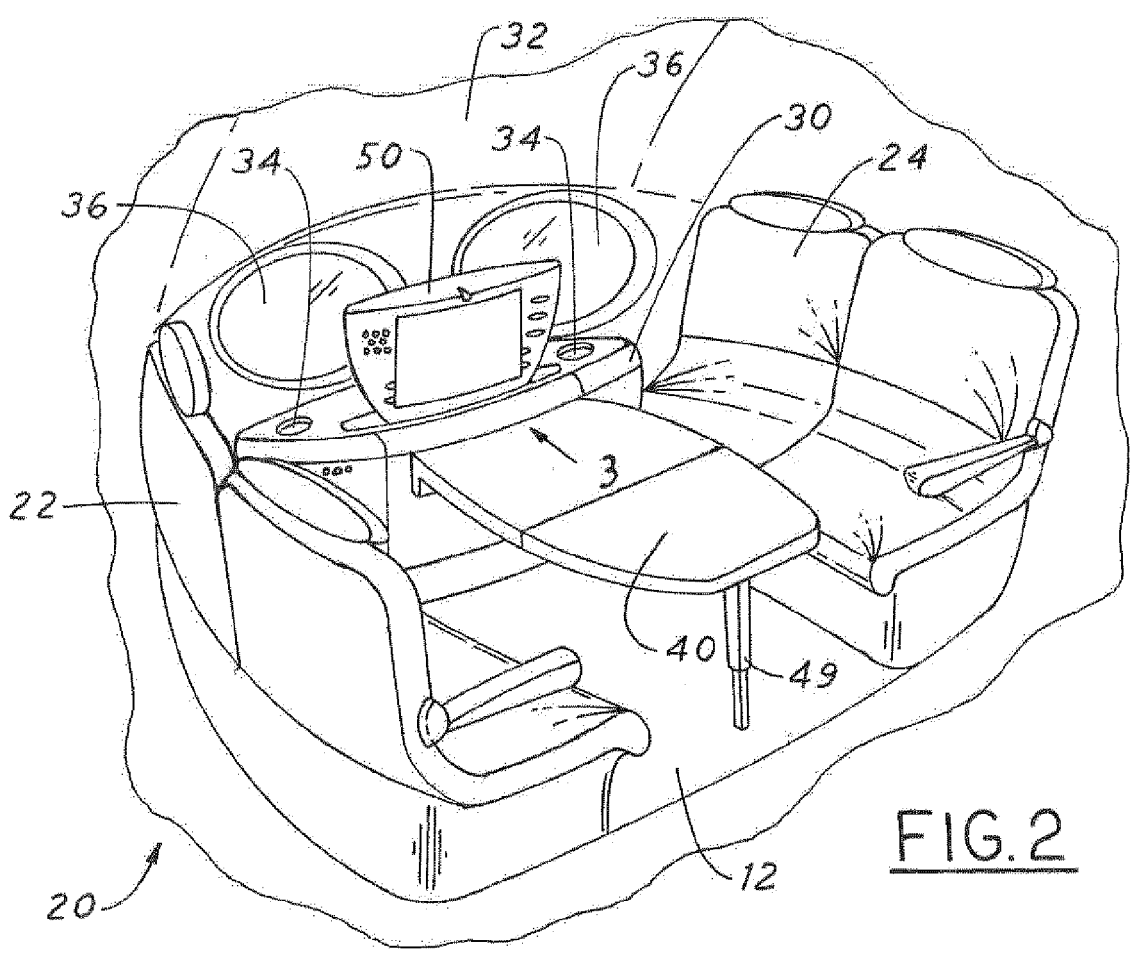
FIG. 2 illustrates a preferred seating arrangement in accordance with the present invention.

One embodiment of the present invention is designated by the reference numeral 20 in FIG. 1 and shown in more detail in FIG. 2. As shown, the seating arrangement 20 includes two pairs of seats 22 and 24 which are positioned "for and aft" facing each other on the floor member 12. The two facing sets of seats 22 and 24 allow face-to-face interaction between the passengers occupying them. This "booth"-type configuration allows families and groups of people to sit together in a more personal and group arrangement.

A credenza or cabinet 30 is positioned on an outer wall 32 of the aircraft. The cabinet 30 can be used to accommodate, for example, a fold-up table, a video monitor, cup holders, and the like. For example, as shown in FIG. 2, a pair of cup holders 34 are provided, along with a pull-up table 40 and a video monitor 50.

As shown in FIG. 2, the "booth"-type configuration 20 consisting of seats 22 and 24 along with the cabinet 30, can be blended into the sidewall 32 of the aircraft, forming a totally integrated look. In this regard, one or more windows 36 can be provided as part of the configuration. The configuration 20 allows for a more personal and private atmosphere for either family or business conferencing.

Since the booth-type configuration of the present invention allows for more interaction between passengers, as well as being a multi-functional configuration discussed in more detail below, the configuration 20 is preferably located in the aft zone of the airplane in order to offer more privacy and minimize any noise or distractions for other passengers.

Figure 3:
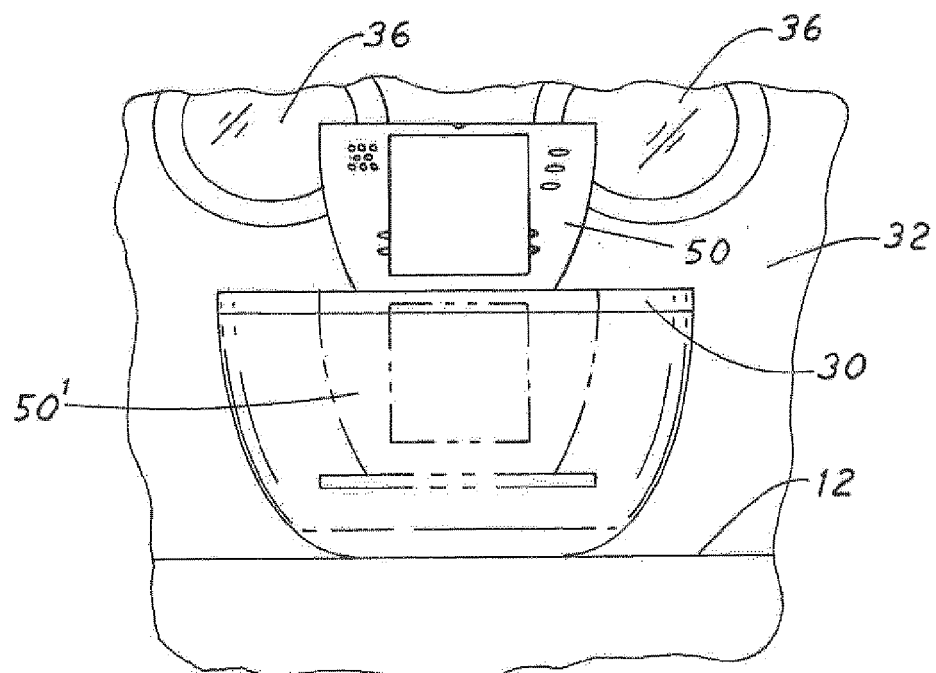
FIG. 3 illustrates a credenza or cabinet with a pull-up video monitor for use with the present invention.

As shown in FIG. 3, the video monitor 50 can be designed so that it can be raised and lowered in the cabinet 30. The stored position of the video monitor is indicated by the reference numeral 50''' in FIG. 3. Any conventional mechanism can be used to assist in raising and lowering the video monitor 50 and thus it is not necessary to describe in detail any particular method or mechanism. Instead of using a plurality of separate smaller video monitors, as currently exists in some aircraft today, providing a single large monitor for each "booth" could significantly simplify the electronic wiring and systems used in aircraft. The cost and expenses would also be reduced.

Figure 4:
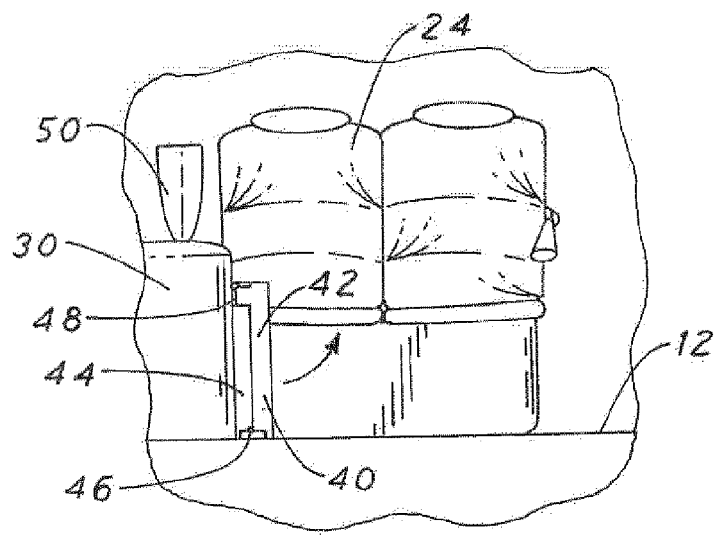
FIGS. 4 and 4A illustrate a first embodiment of a pull-up table for use with the present invention.
Figure 4A:
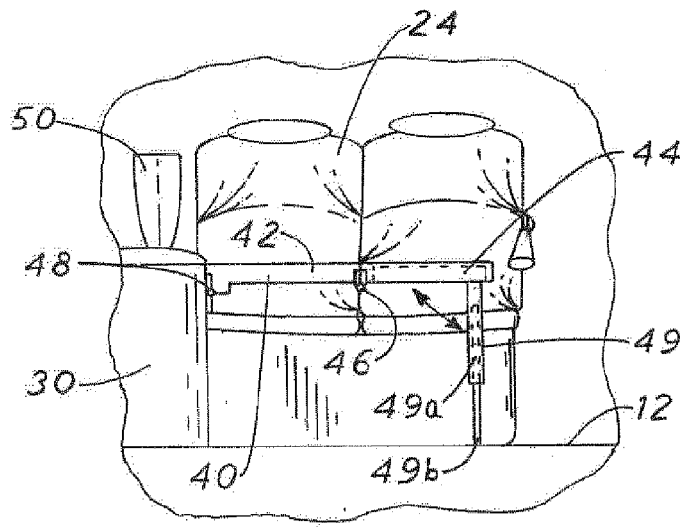

A first embodiment of a pull-up table member 40 is shown in more detail in FIGS. 4 and 4A. As shown, the table 40 preferably has two sections 42 and 44 which are hinged together at one end 46. The first section 42 is also hinged at end 48 to the cabinet 30. When the table 40 is deployed, as shown in FIG. 4A, one or more leg members 49 can be utilized to support the outer end. In this regard, the leg member 49 can be hidden within the table portion 44 and pulled out for use as necessary. The leg member 49 also can have telescopic sections 49A and 49B in order to be stored in its rest position. The table surface can be used for various activities, such as eating, working, game playing, and the like.

Figure 9B:
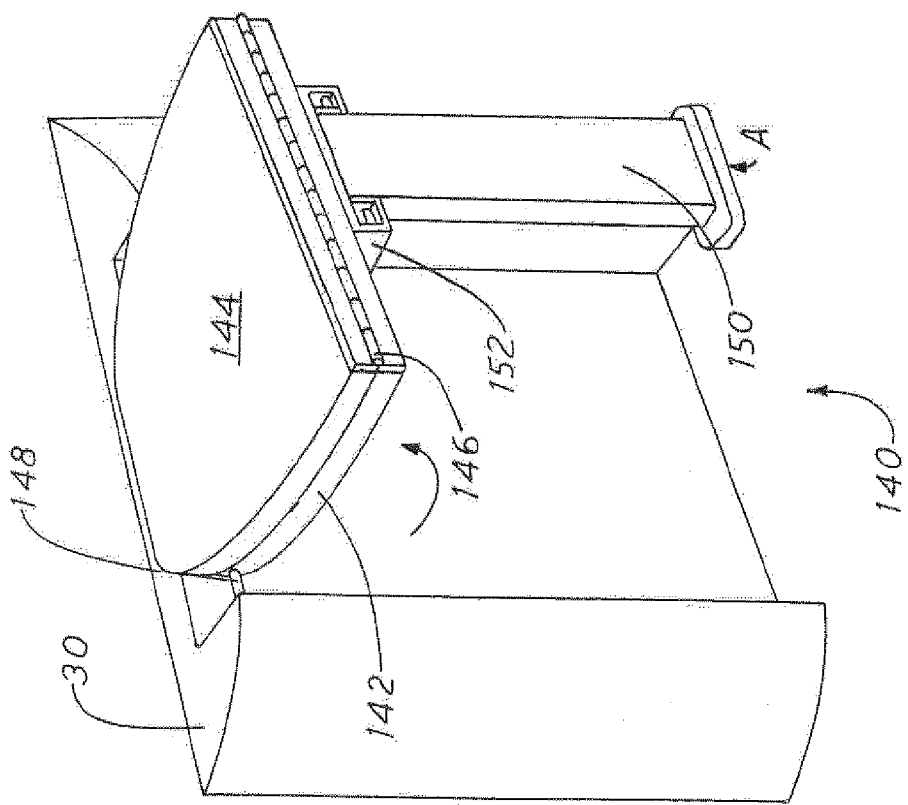
FIGS. 9A–9D illustrate another embodiment of a pull-up table which can be used with the present invention.
Figure 9A:
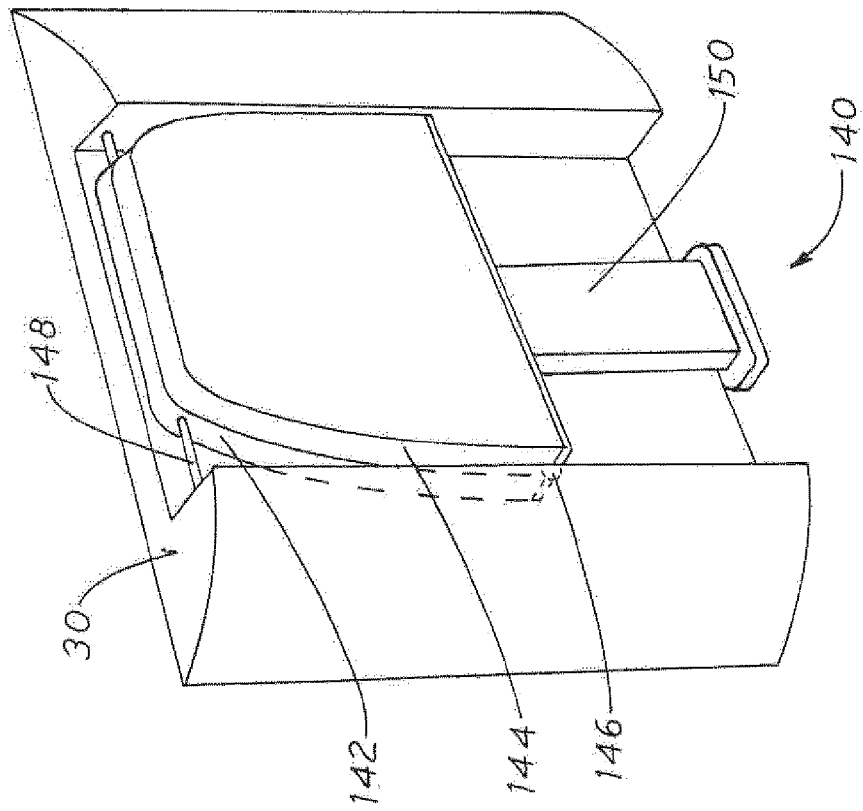

Another embodiment of a pull-up table which can be used with the present invention is illustrated in FIGS. 9A and 9B and indicated generally by the reference numeral 140. The table 140 has two portions 142 and 144 which are hinged together at one end 146. The opposite end of table portion 142 is pivotably attached at 148 to the cabinet 30'. A sliding leg member 150 is used to support the table 140 when it is in the deployed position for use by passengers.

Figure 9D:
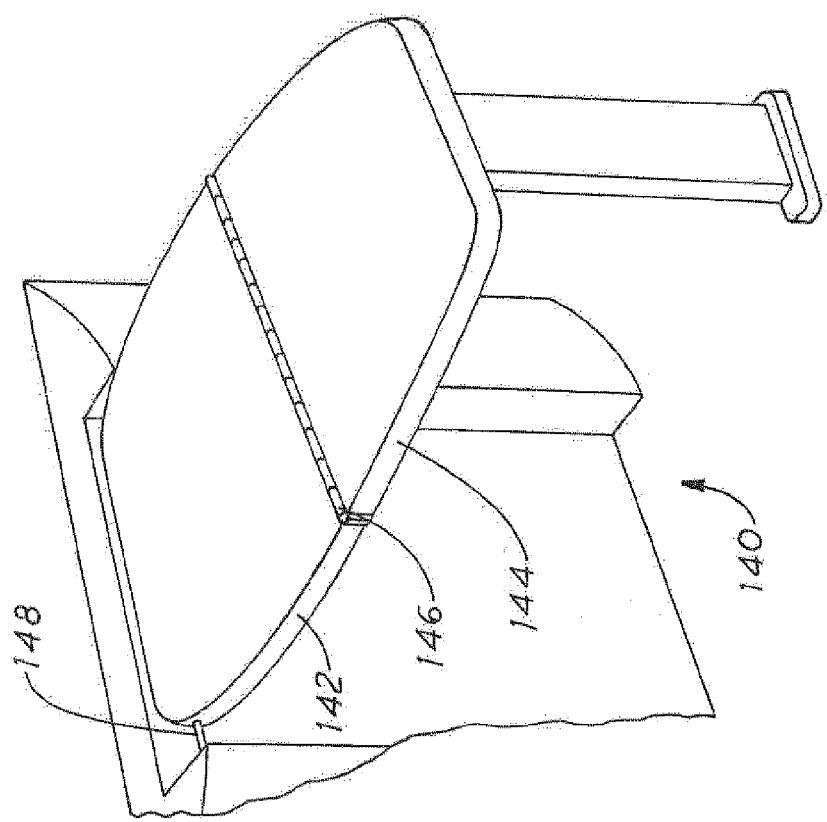
Figure 9C:
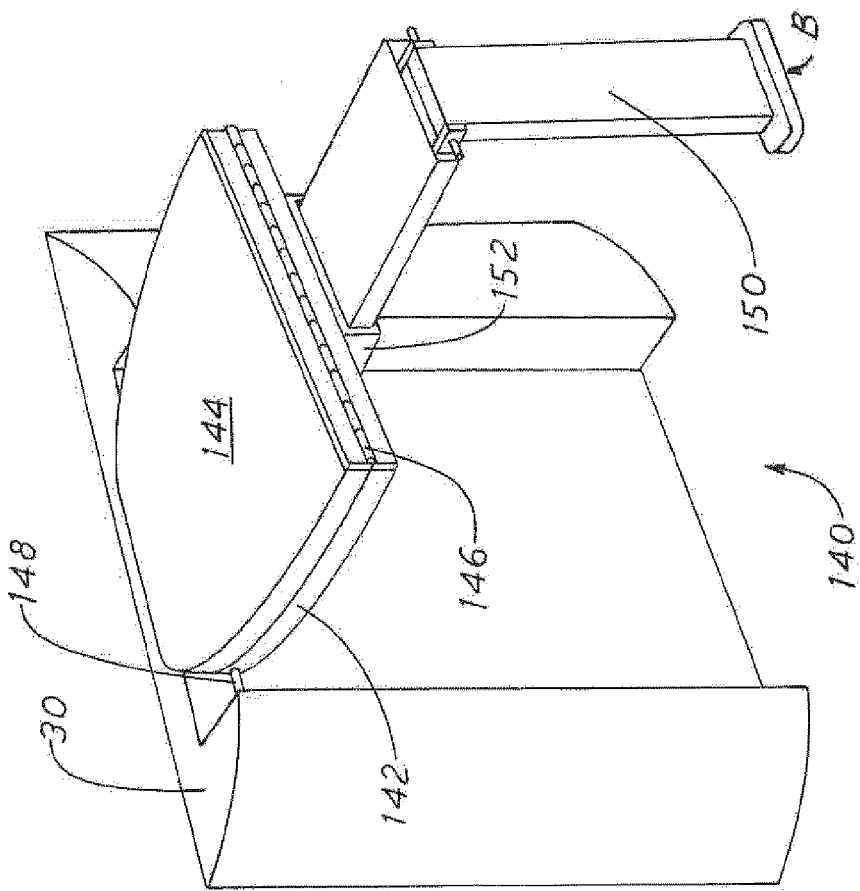

FIG. 9A depicts the table 140 in its stowed position adjacent the cabinet 30. In FIG. 9B, the table 140 is positioned in a first "use" position where half the area of the full table can be utilized by passengers. In this regard, the table 140 is rotated 90° from its rest position and the leg member 150 is slid along guide track 152 to the position "A" as shown. Thereafter, when the table 14 is desired to be used in its fully deployed position, the leg 150 is pulled out further to its fully deployed position "B". The leg guide track 152 is telescopic in order to allow the leg member 150 to be positioned as shown in FIG. 9C. Thereafter, the table portion 144 is flipped over on top of the extended leg guide 152 to the position shown in FIG. 9D. At this point, the table member 140 is fully deployed and available for use.

Although two different embodiments of a pull-up table for use with the present invention are shown and described herein, it is to be understood that the invention is not limited to these two embodiments. Other types, shapes, sizes and configurations of pull-up tables, with or without leg members, can be utilized.

Figure 5:
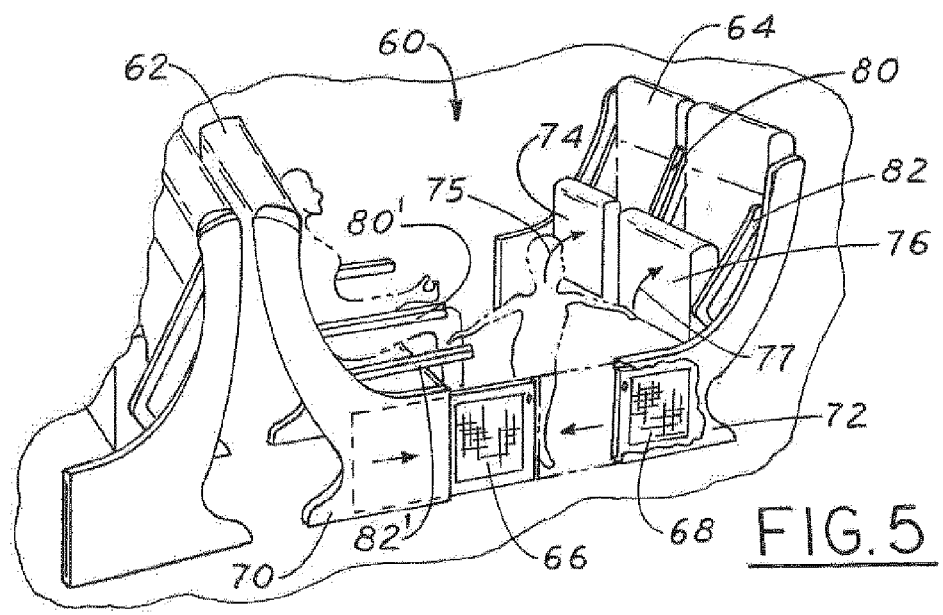
FIG. 5 illustrates sliding gates which can be deployed to form an enclosed play area for children in accordance with another embodiment of the invention.

FIG. 5 illustrates another preferred embodiment o the present invention in which a booth-type seating configuration is particularly adapted for use by families with small children. In FIG. 5, the seating arrangement is identified generally by the reference numeral 60 and consists of two sets or pairs of seats 62 and 64 which are positioned facing one another. A pair of sliding gates 66 and 68 are positioned in the end members 70 and 72 of the sets of seats 62 and 64. As shown in FIG. 5, the gate members 66 and 68 can be deployed to form an enclosed play area for children which prevents them from straying into the aisle or disrupting other passengers. Also, as shown in FIG. 5, in order to provide more play area and space in the booth-type seating configuration 60, the seat bottom cushions or portions 74 and 76 of the seats 64 can be flipped up as shown by arrows 75 and 77. The seat bottom cushions of seat 62 can also be provided with the same mechanisms to allow them to be flipped up in the same manner as the seat bottom cushions of seats 64. These theater-style seat bottoms can be utilized to provide more floor space when they are rotated to their up positions.

In addition, arm rests 80 and 82 of seats 64, as well as corresponding arm rests 80'' and 82'' of seats 62, can be rotated to the positions shown in the right side of FIG. 5 in order to provide more space in the play area for children.

The gate embodiment shown in FIG. 5 is only one embodiment of enclosure-type structures or devices which can be used in accordance with the present invention. For example, rather than a pair of gate members 66 and 68, only one larger gate member could be provided. Also, a folding-type gate member or members could be provided. In addition, a pull-out mesh-type screen could be provided in place of one or more gate members, or in combination with one or more gate members.

Figure 6:
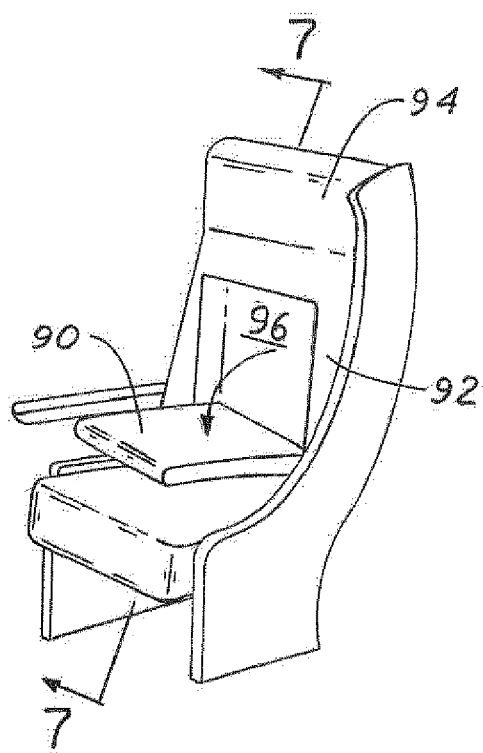
FIGS. 6 and 7 illustrates children "booster-type" seats in accordance with a further embodiment of the invention.
Figure 7:
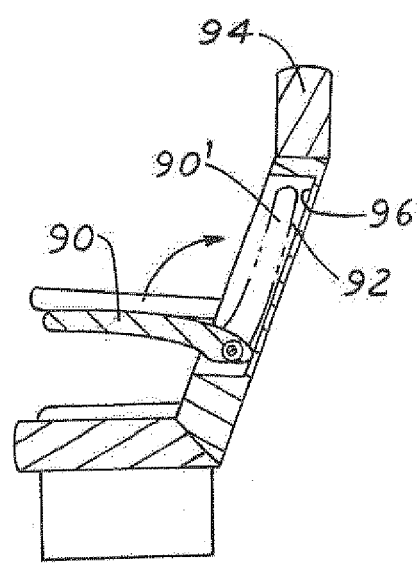

As shown in FIGS. 6 and 7, a booster seat 90 can be provided as part of the seatback 92 of a seat member 94. The booster seats are particularly useful for children, particularly when a table member is utilized as shown in FIG. 2. The booster seat member is rotated in and out of a cavity 96 in the seat back 92.

Figure 8:
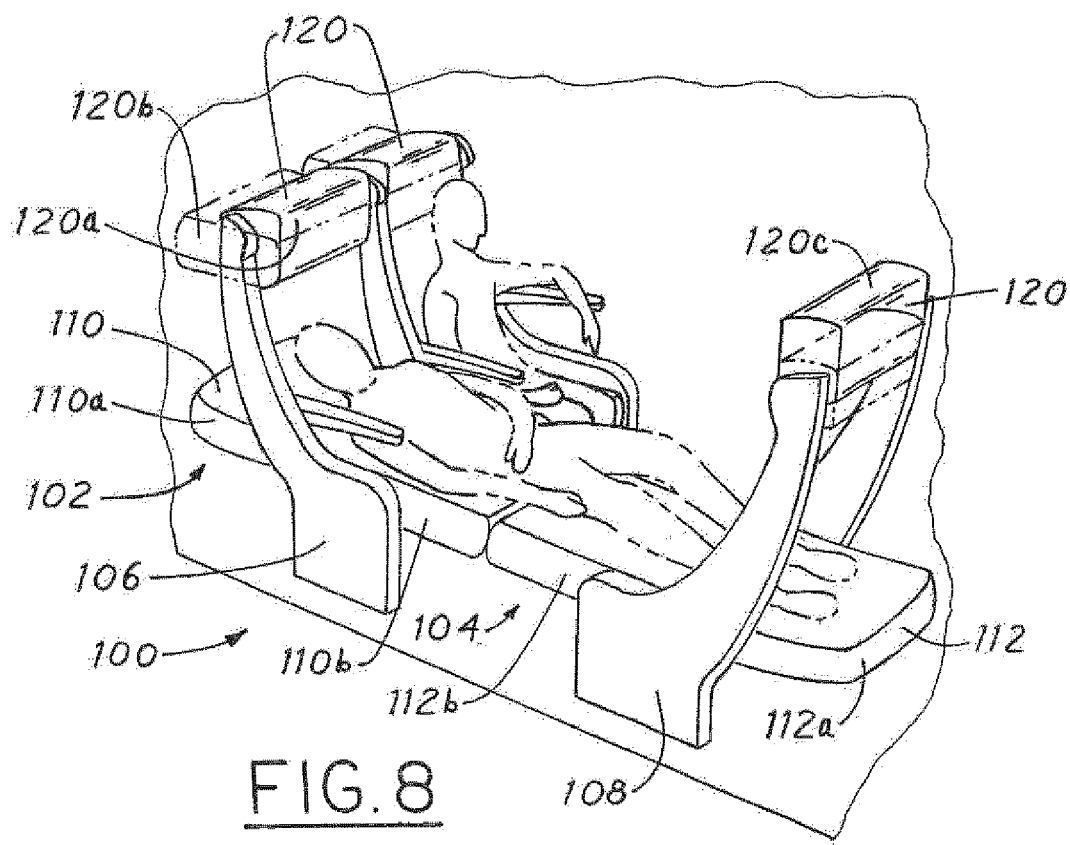
FIG. 8 illustrates a still further embodiment of the present invention in which the cushions of adjacent facing seats can combine to provide a flat sleeping or resting configuration.

FIG. 8 illustrates another embodiment of the present invention in which adjacent facing seat members can be utilized to form a flat or planar resting or sleeping configuration for passengers. This arrangement is designated generally by the reference numeral 100. The configuration comprises facing seat members 102 and 104 which are positioned in fixed frame members 106 and 108, respectively. The seats 110 and 112 each consist of two sliding and articulating cushion members. Seat members 110A and 112A are seatback cushion members, while seat members 110B and 112B are seat bottom cushion members. As shown in FIG. 8, the two seat bottom cushion members 110B and 112B are adapted to slide toward one another in order to provide a flat resting/sleeping surface. At the same time, the seat back cushion members 110A and 112A are adapted to slide downwardly in the frame members 106 and 108 and rotate in order to extend the flat surface.

The head rest members 120 in the seat members can also be rotated or articulated to various positions. These positions are indicated by reference numerals 120A, 120B, and 120C in FIG. 8. As shown, the head rest cushions 120 can be positioned at any of the three positions as desired by the passenger.

While the invention has been described in connection with one or more embodiments, it is to be understood that the specific mechanisms, processes and procedures which have been described are merely illustrative of the principles of the invention, numerous modifications may be made to the methods and apparatus described without departing from the spirit and scope of the invention as defined by the appended claims.

The invention claimed is:

1. A seating arrangement in an airplane comprising:
   a first set of at least two passenger seats in contact with each other and facing in a first direction,
   a second set of at least two passenger seats in contact with each other and facing a second direction opposite to said first direction,
   said first and second sets of passenger seats being positioned closely adjacent and facing one another forming a conference area,
   a cabinet positioned adjacent said first and second sets of passenger seats, and
   a table member directly and pivotably connected to said cabinet and adapted to be stowed adjacent to said cabinet,
   said table member comprising two portions rotatably connected together, being adapted to be partially deployed to a first use position and a second and fully deployed position for use by passengers and a leg member for supporting said table member wherein said leg member is slidably attached to said table member.

2. The seating arrangement as described in claim 1 further comprising a video monitor in said cabinet.

3. The seating arrangement as described in claim 1 wherein said video monitor can be raised for viewing and lowered for storage in said cabinet.

4. The seating arrangement as described in claim 1 further comprising a child booster seat positioned in one of said sets of passenger seats.

5. The seating arrangement as described in claim 1 further comprising a gate member attached to at least one of said first and second sets of passenger seats.

6. The seating arrangement as described in claim 5 wherein said gate members are adapted to form an enclosure which includes said first and second sets of passenger seats.

7. The seating arrangement as described in claim 1 wherein at least one seat of said first set of passenger seats and at least one seat of said second set of passenger seats are adapted to articulate and slide to form a combined substantially flat sleeper surface for a passenger.

8. The seating arrangement as described in claim 1 wherein at least one seat of said first set of passenger seats has a fixed seat back portion and a flip-up seat bottom portion.

* * * * *